US006678964B2

(12) United States Patent
Regitz

(10) Patent No.: US 6,678,964 B2
(45) Date of Patent: Jan. 20, 2004

(54) TRACER DEVICE

(75) Inventor: Thilo Regitz, Kirkel (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 09/976,189

(22) Filed: Oct. 11, 2001

(65) Prior Publication Data

US 2003/0070312 A1 Apr. 17, 2003

(51) Int. Cl.$^7$ .................................................. G01B 5/20
(52) U.S. Cl. ...................................... 33/542; 33/553
(58) Field of Search ........................ 33/542, 544, 549, 33/551, 553, 554, 555, 533

(56) References Cited

U.S. PATENT DOCUMENTS

| | | | | |
|---|---|---|---|---|
| 917,444 A | * | 4/1909 | James | 33/533 |
| 928,492 A | * | 7/1909 | Brink | 33/533 |
| 4,200,987 A | * | 5/1980 | Schmitt | 33/542 |
| 4,268,022 A | * | 5/1981 | Looney | 33/533 |
| 4,403,860 A | * | 9/1983 | Pryor | 33/542 |
| 4,706,360 A | * | 11/1987 | Callens et al. | 33/554 |
| 5,276,974 A | * | 1/1994 | Chanoni et al. | 33/554 |
| 5,321,894 A | * | 6/1994 | Bury | 33/553 |
| 5,705,741 A | * | 1/1998 | Eaton et al. | 33/551 |
| 5,740,616 A | * | 4/1998 | Seddon et al. | 33/554 |
| 6,169,290 B1 | * | 1/2001 | Rosberg et al. | 33/533 |
| 6,295,866 B1 | * | 10/2001 | Yamamoto et al. | 33/501 |
| 2002/0124427 A1 | * | 9/2002 | Nishimura et al. | 33/554 |

FOREIGN PATENT DOCUMENTS

| | | | | |
|---|---|---|---|---|
| JP | 55114904 | * | 9/1980 | 33/542 |

* cited by examiner

Primary Examiner—Christopher W. Fulton
Assistant Examiner—Travis Reis
(74) Attorney, Agent, or Firm—Kenyon & Kenyon

(57) ABSTRACT

A tracer device having a tracer arm is mounted in an axial guide and is movable back and forth in the x direction while measuring the path, and a tracer head is mounted at the free area of the tracer arm, is in contact with the surface of a part during a measurement and, during its travel in the x direction, is deflected by the surface contours in a z direction that is perpendicular to the x direction, and having an analyzer device for detecting and analyzing the deflections in the z direction as a function of the path in the x direction. An easy to handle, compact design is provided since the front section of the tracer arm, which is rigid per se, is provided with a tracer leg that forms an articulated link of the tracer head to the tracer arm, and a measuring element that detects the deflection in the z direction is arranged on the tracer leg.

15 Claims, 2 Drawing Sheets

TRACER DEVICE

FIELD OF THE INVENTION

The present invention relates to a tracer device having a tracer arm which is mounted in an axial guide and is movable back and forth in the x direction while measuring the path, and a tracer head which is mounted at the free end area of the tracer arm, is in contact with the surface of a part during a measurement and, during its travel in the x direction, is deflected by the surface contours in a z direction which is perpendicular to the x direction, and having an analyzer device which detects and analyzes the deflections in the z direction as a function of the path in the x direction.

BACKGROUND INFORMATION

A tracer device, for example, like that in the German catalog of *Taylor Hobson,* 7/97, pp. 2, 3, may be used for measuring surface structures such as, for example, small radii or the roughness of metal materials in the order of magnitude of a few micrometers. A tracer head which traces the surface by tactile scanning while being deflected in the z direction according to the surface contour, having a suitable (e.g., pointed or rounded) tracer tip, is mounted on a rigid tracer arm which is movable back and forth in an axial direction (x direction) and is mounted pivotably about an axis on the device in the area of the axial guide.

The pivoting movements are converted into electrical signals as a function of the path in the x direction and electronically analyzed to evaluate the traced surface contour. Difficulties may arise in such a tracing when the surface to be traced is located inside a narrow channel of the part, which, in addition, cannot be viewed laterally. For this reason, such tracer devices are used for measuring open, visible surfaces. To expose an internal surface, the part is cut open and thus destroyed.

To non-destructively measure internal surface structures, such as radii on two bore holes running perpendicular into each other, an elastomer impression method may be used, for example.

SUMMARY OF THE INVENTION

An object of an exemplary embodiment of the present invention is to provide a tracer device by which particular surface structures can also be easily measured even in narrow bore holes of a part.

The front section of a tracer arm, which is rigid per se, is provided with a tracer leg which forms an articulated link of the tracer head to the tracer arm, a measuring element which detects the deflection in the z direction being arranged on the tracer leg.

Since the tracer arm, which is rigid per se and is rigidly held in the axial guide, is not moved in the z direction over its entire length, and only the tracer leg mounted on it which is relatively short is moved, the tracer arm with its tracer leg can also be inserted deep into narrow channels of a part in order to take surface measurements there. For example, roundings in the area of bore holes running transversely to one another having rounding radii in the range of a few micrometers can be traced without difficulty. It is believed that the danger of the tracer head becoming hooked on the surface is also considerably diminished, since the long and rigid tracer arm is no longer deflected.

The tracer leg is fixedly attached to the tracer arm and is designed to be flexible, the term "fixedly" meaning that the tracer leg forms a fixed articulation (as opposed to a loose articulation), so structures in the range of less than 1 μm can still be traced and the danger of the tracer head becoming hooked is further substantially diminished. The tracer leg can also be mounted replaceably on the tracer arm to enable different tracer heads to be used, for example.

Different detecting devices for the deflection in the z direction may be obtained since the measuring element is an expansion measuring strip unit, an optical deflection element, or a piezoelectric, inductive, or capacitive sensor.

It is believed to be advantageous if the expansion measuring strip unit has two paired expansion measuring strips to compensate for temperature errors.

Another exemplary embodiment that is different from the tracer leg which is fixedly mounted on the tracer arm has a tracer leg connected to the tracer arm via an articulated shaft as a rocker. A "simple" design may be implemented by connecting the rocker to an optical deflection element or by providing it with an inductive or capacitive sensor to detect the pivoting of the rocker.

A "simple" optical measuring sensor, which may be easy to apply under the given circumstances, is obtained by the fact that the optical deflection element is part of an optical arrangement which in turn has a light source mounted on the tracer arm for emitting a light beam which is supplied to the optical deflection element, a waveguide device, and a position-sensitive optical receiver which detects the beam reflected by the optical deflection element. It is believed that assembly and adjustment, as well as measurement in a narrow channel, may be better since the light source and the optical receiver, as well as an optical unit connected upstream from the optical receiver, are arranged on a section of the tracer arm which faces the axial guide.

Adjustment of the tracer device and handling during measurement are substantially simplified since the axial guide can be attached to the part using an adapter that is adapted to an insertion opening of a part to be traced. With these measures, it is believed that an expensive test bench having attaching and adjusting devices is no longer required, since the tracer device is precisely associated with the part via the adapter, and the point of measurement is always precisely established when measuring different parts of the same type and can be easily moved into position, even automatically, without having to visually check the position of the measuring head using simple programming in particular. It is believed that the danger of destroying the measuring head by accidentally hitting an internal wall of the part may also be substantially reduced.

For easily positioning the device with respect to different measuring points within the part, the tracer arm is rotatable about its axis automatically and reproducibly using a control device of the axial guide.

DETAILED DESCRIPTION

Figure 1A:
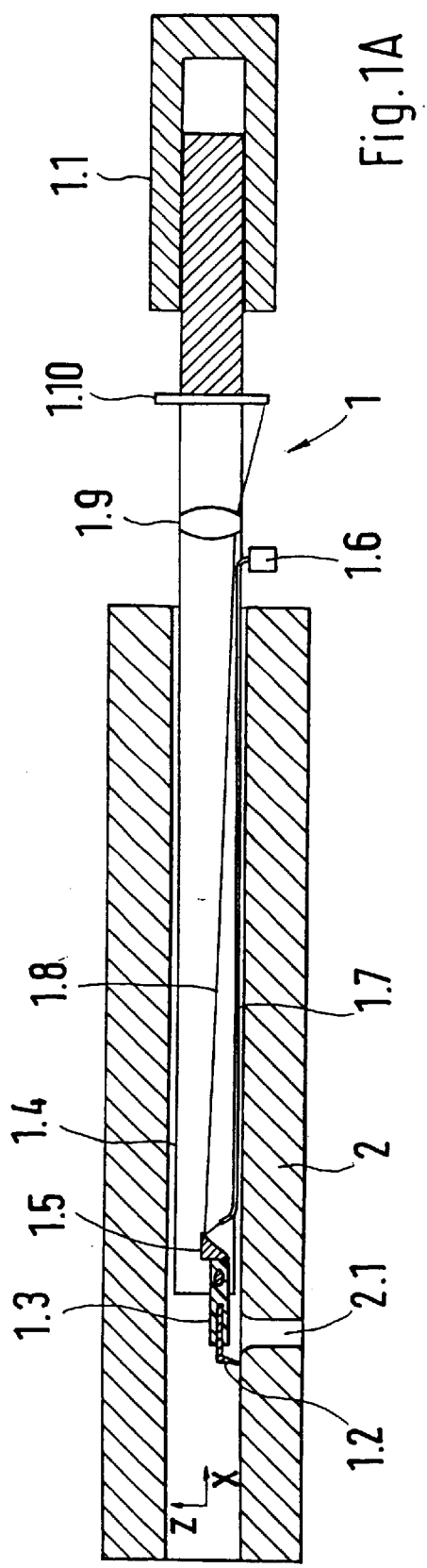
FIG. 1A shows a first exemplary embodiment of a tracer device in longitudinal section in a position of a measuring head.

As shown in FIG. 1A, a tracer device 1 having a tracer arm 1.4, on whose front end a tracer leg 1.3 with a pointed or rounded tracer head 1.2 is mounted, is inserted into a narrow bore hole of a metallic part, for example, a manifold, until it is in the proximity of a transverse bore hole 2.1 opening into cavity 2.2 of the narrow channel, to trace a transition radius there using tracer head 1.2. For this purpose, tracer arm 1.4, which is rigid per se, is moved in the axial direction of cavity 2.2 using an axial guide 1.1, tracer head 1.2 being deflected in the z direction according to the shape of the transition radius.

Figure 1B:
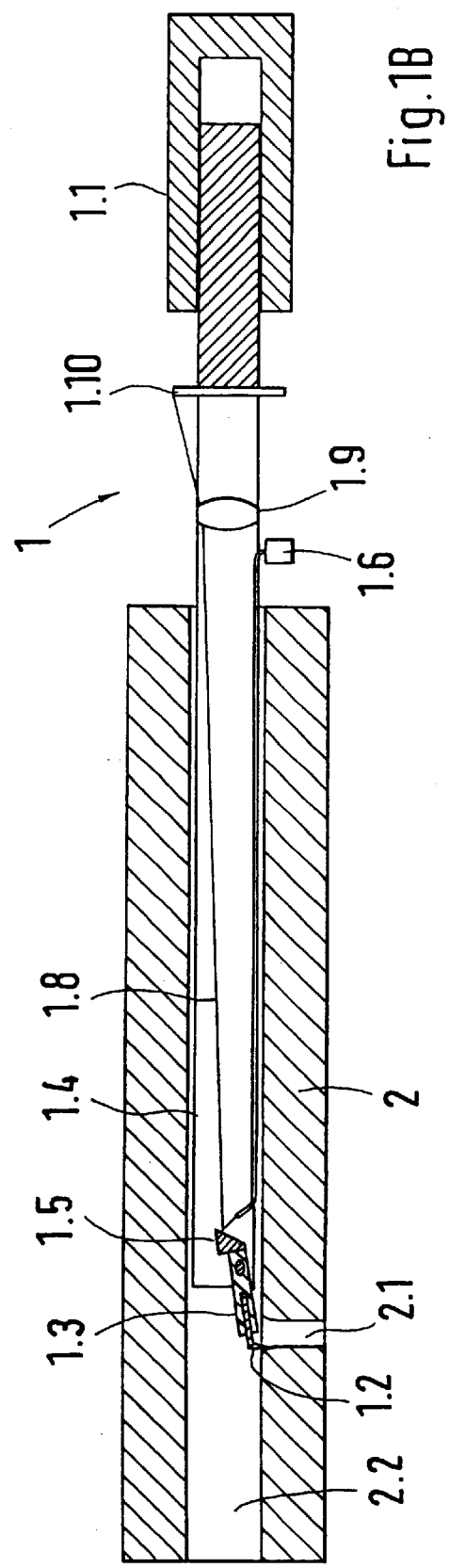
FIG. 1B shows the first exemplary embodiment of a tracer device in longitudinal section in a different position of the measuring head.

The displacement of tracer arm 1.4 and thus also of tracer head 1.2 in the axial direction, i.e., in the x direction, is detected using a path sensor (not shown) provided in axial guide 1.1 and associated with the deflection of tracer head 1.2 in the z direction via an analyzer device. Contrary to FIG. 1A, FIG. 1B shows the tracer head slightly deflected downwards in the z direction along the transition radius. The deflection in the z direction is a few tens or hundreds of $\mu$m, for example. However, surface roughness in the order of less than 10 $\mu$m can also be detected.

Tracer leg 1.3 is mounted on the front end of tracer arm 1.4, for example, on an articulated shaft, and rigidly provided with an optical deflection element 1.5. A light source 1.6, for example, a laser diode, is arranged on the end section of tracer arm 1.4 facing axial guide 1.1. The beam of the light source is guided via a waveguide 1.7 in the form of an optical fiber to optical deflection element 1.7, and there deflected, according to the angle of inclination of tracer leg 1.3 due to a z deflection, as reflected beam 1.8 and supplied, via an optical unit 1.9, to a position-sensitive optical receiver, for example, a CCD line which produces an electrical signal of the z deflection. Both optical receiver 1.10 and upstream optical unit 1.9 are located in the end section of tracer arm 1.4 facing axial guide 1.1.

The articulated mounting of tracer leg 1.3 shown in FIGS. 1A and 1B on tracer arm 1.4 is a pivoting articulation on a pivot shaft, where a slight play cannot be fully ruled out and therefore tracing in the z direction is limited to a minimum of 1 $\mu$m. In principle, even finer resolutions may be provided in the z direction by fixedly connecting tracer leg 1.3 to tracer arm 1.4 and through a flexible design of tracer leg 1.3, so that a fixed link, i.e., a link through the material itself, is formed. The z deflection of tracer leg 1.3, i.e., of tracer head 1.2, can also be detected by other measurement sensors, for example, inductively or capacitively, where such measurement sensors are also suitable for pivoting articulations. In the case of tracer leg 1.3 having a fixed articulation, piezoelectric elements or expansion measuring strips DMS 1.11 are believed to be particularly well suited. Such a design is shown in FIGS. 2A to 2C.

Figure 2A:
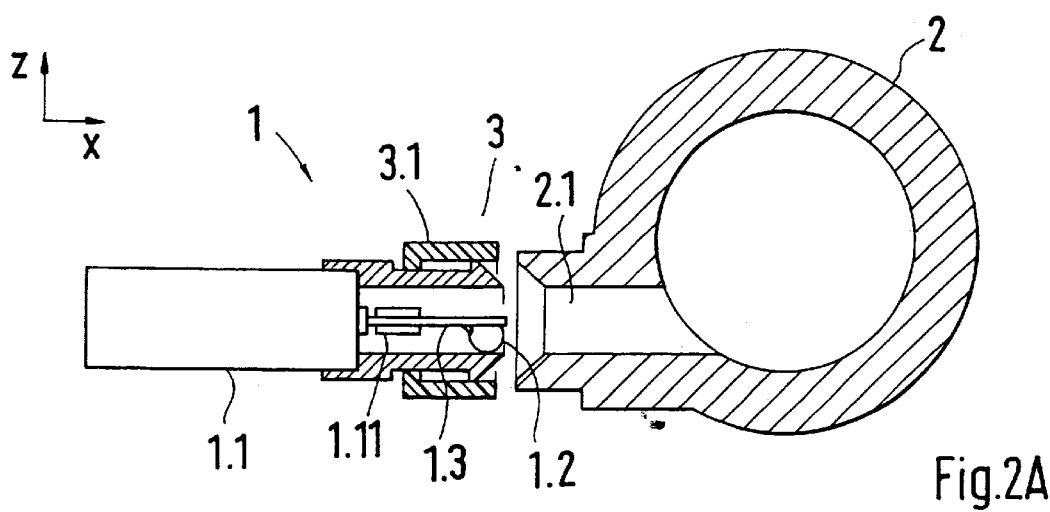
FIG. 2A show a second exemplary embodiment of the tracer device in a position with respect to a part and in a location of the tracer head.

In FIG. 2A, part 2 and tracer device 1 are shown separated, with an adapter 3 having an internal part and a union nut 3.1 being mounted on axial guide 1.1 to achieve exact positioning of tracer device 1 on part 2. FIGS. 2B and 2C illustrate tracer device 1 coupled to part 2. Union nut 3.1 is threaded onto a threaded part of a transverse bore hole which is provided with a connecting piece, so that tracer device 1 is precisely positioned with respect to the location to be traced in the transition area between transverse bore hole 2.1 and cavity 2.2.

The position of the area to be traced can be input in a control device of tracer device 1 via appropriate adjustment, programming in particular, so that the device can position itself in this area automatically without visual checking, and damage to the tracer head caused, for example, by striking the wall opposite the measured area of cavity 2.2, may be prevented. Thus, it is believed that simple and precise adjustment of tracer device 1 on part 2 may be guaranteed without an expensive test bench. It is also believed that such an arrangement may be particularly advantageous in the case of mass production of identical parts.

Figure 2B:
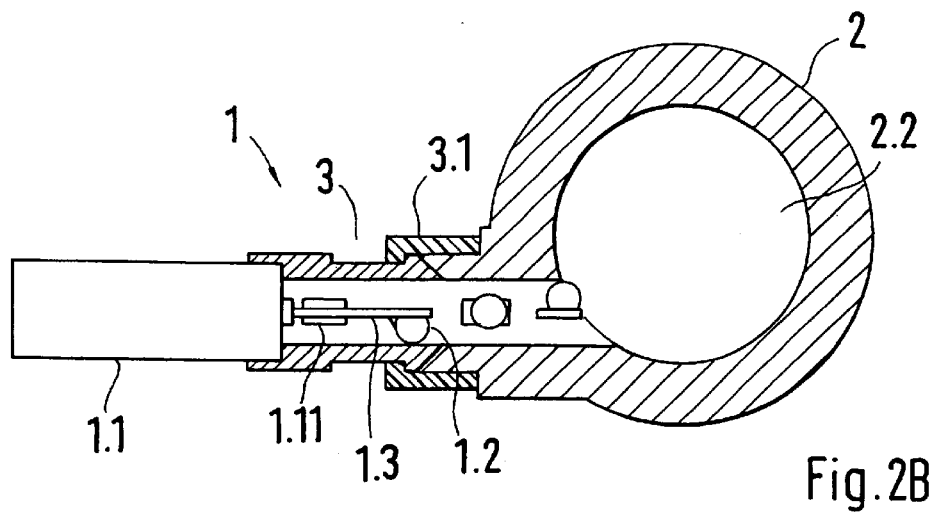
FIG. 2B show the second exemplary embodiment of the tracer device in a different position with respect to the part and in a different location of the tracer head.
Figure 2C:
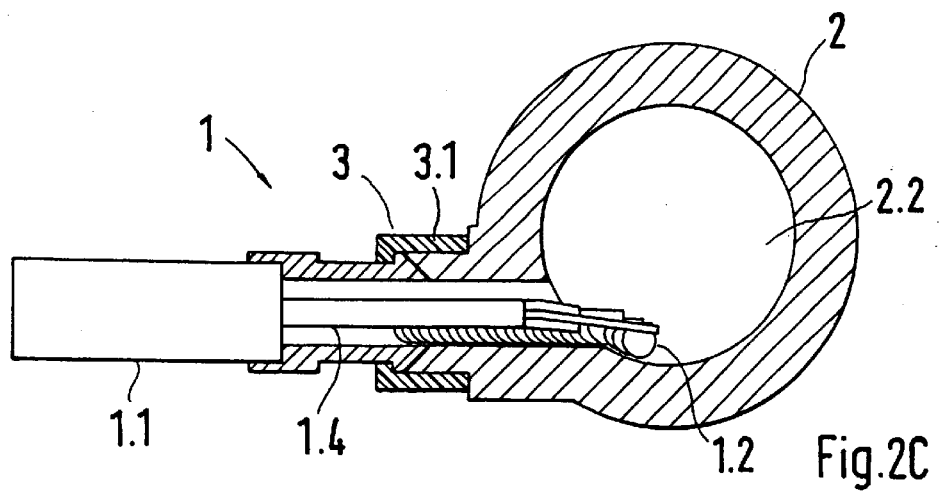
FIG. 2C show the second exemplary embodiment of the tracer device in another different position with respect to the part and in another different location of the tracer head.

As FIGS. 2B and 2C also show, tracer head 1.2, which is rounded in this case, with tracer arm 1.4 can be brought into different axial rotation positions automatically and reproducibly in order to measure the transition radius between transverse bore hole 2.1 and cavity 2.2 in different angular positions over the periphery, for example.

In the exemplary embodiment according to FIGS. 2A to 2C, a pair of measuring strips 1.11 is applied to flexible tracer leg 1.3, which convert the deflection of tracer leg 1.3 in the z direction into an electrical signal, which is supplied to the control device for analysis. The pair of expansion measuring strips 1.11 also provides, compared with a single expansion measuring strip 1.11, error compensation, for example, of temperature effects. FIG. 2C shows a tracing path of rounded tracer head 1.2 in the x direction.

It is believed that the above exemplary tracer devices are designed to be compact and/or easy to handle.

What is claimed is:

1. A tracer device, comprising:
   a tracer arm mounted in an axial guide and having a front section of the tracer arm, which is rigid per se, the tracer arm being movable back and forth in an x direction during a measuring of a path;
   a tracer head mounted at a free end area of the tracer arm, the tracer head being contactable with a surface of a part during a measurement, and, during its travel in the x direction, being deflectable by a surface contour in a z direction that is perpendicular to the x direction;
   an analyzer device for detecting and analyzing deflections in the z direction as a function of the path in the x direction;
   tracer leg associated with the front section of the tracer arm, which is rigid per se, the tracer leg forming an articulated link of the tracer head to the tracer arm; and
   a measuring element arranged on the tracer leg for detecting the deflections in the z direction;
   wherein the tracer leg is fixedly attached to the tracer arm, and is flexible;
   wherein the measuring element includes at least one of an expansion measuring strip unit, an optical deflection element, a piezoelectric sensor, an inductive sensor, and a capacitive sensor; and
   wherein the measuring element includes the optical deflection element as part of an optical arrangement, the optical arrangement including a light source mounted on the tracer arm for emitting a light beam to the optical deflection element, a waveguide device, and a position-sensitive optical receiver for detecting a beam reflected by the optical deflection element.

2. The tracer device of claim 1, further comprising:
   an optical receiver; and
   an optical unit connected upstream from the optical receiver;

wherein the light source, the optical receiver, and optical unit are arranged on a section of the tracer arm facing the axial guide.

3. The tracer device of claim 2, wherein the axial guide is attachable to a part to be traced using an adapter that is adapted to an insertion opening of the part to be traced.

4. The tracer device of claim 2, wherein the axial device is associated with a control device, and the tracer arm is rotatable about its axis automatically and reproducibly by the control device.

5. The tracer device of claim 1, wherein the axial guide is attachable to a part to be traced using an adapter that is adapted to an insertion opening of the part to be traced.

6. The tracer device of claim 1, wherein the axial device is associated with a control device, and the tracer arm is rotatable about its axis automatically and reproducibly by the control device.

7. A tracer device, comprising:

a tracer arm mounted in an axial guide and having a front section of the tracer arm, which is rigid per se, the tracer arm being movable back and forth in an x direction during a measuring of a path;

a tracer head mounted at a free end area of the tracer arm, the tracer head being contactable with a surface of a part during a measurement, and, during its travel in the x direction, being deflectable by a surface contour in a z direction that is perpendicular to the x direction;

an analyzer device for detecting and analyzing deflections in the z direction as a function of the path in the x direction;

a tracer leg associated with the front section of the tracer arm, which is rigid per se, the tracer leg forming an articulated link of the tracer head to the tracer arm; and a measuring element arranged on the tracer leg for detecting the deflections in the z direction;

wherein the axial guide is attachable to a part to be traced using an adapter that is adapted to an insertion opening of the part to be traced.

8. A tracer device, comprising:

a tracer arm mounted in an axial guide and having a front section of the tracer arm, which is rigid per se, the tracer arm being movable back and forth in an x direction during a measuring of a path;

a tracer head mounted at a free end area of the tracer arm, the tracer head being contactable with a surface of a part during a measurement, and, during its travel in the x direction, being deflectable by a surface contour in a z direction that is perpendicular to the x direction;

an analyzer device for detecting and analyzing deflections in the z direction as a function of the path in the x direction;

a tracer leg associated with the front section of the tracer arm, which is rigid per se, the tracer leg forming an articulated link of the tracer head to the tracer arm; and a measuring element arranged on the tracer leg for detecting the deflections in the z direction;

wherein the tracer leg is fixedly attached to the tracer arm, and is flexible;

wherein the measuring element includes at least one of an expansion measuring strip unit, an optical deflection element, a piezoelectric sensor, an inductive sensor, and a capacitive sensor;

wherein the expansion measuring strip unit includes two paired expansion measuring strips; and wherein the axial device is associated with a control device, and the tracer arm is rotatable about its axis automatically and reproducibly by the control device.

9. A tracer device, comprising:

a tracer arm mounted in an axial guide and having a front section of the tracer arm, which is rigid per se, the tracer arm being movable back and forth in an x direction during a measuring of a path;

a tracer head mounted at a free end area of the tracer arm, the tracer head being contactable with a surface of a part during a measurement, and, during its travel in the x direction, being deflectable by a surface contour in a z direction that is perpendicular to the x direction;

an analyzer device for detecting and analyzing deflections in the z direction as a function of the path in the x direction;

a tracer leg associated with the front section of the tracer arm, which is rigid per se, the tracer leg forming an articulated link of the tracer head to the tracer arm; and a measuring element arranged on the tracer leg for detecting the deflections in the z direction;

wherein the tracer leg is connected to the tracer arm via an articulated shaft as a rocker;

wherein one of the following is satisfied:
the measuring element includes the optical deflection element, the optical deflection element being connected to the rocker; and
the measuring element includes one of an inductive sensor and a capacitive sensor for detecting a pivoting of the rocker; and wherein the axial guide is attachable to a part to be traced using an adapter that is adapted to an insertion opening of the part to be traced.

10. A tracer device, comprising:

a tracer arm mounted in an axial guide and having a front section of the tracer arm, which is rigid per se, the tracer arm being movable back and forth in an x direction during a measuring of a path;

a tracer head mounted at a free end area of the tracer arm, the tracer head being contactable with a surface of a part during a measurement, and, during its travel in the x direction, being deflectable by a surface contour in a z direction that is perpendicular to the x direction;

an analyzer device for detecting and analyzing deflections in the z direction as a function of the path in the x direction;

a tracer leg associated with the front section of the tracer arm, which is rigid per se, the tracer leg forming an articulated link of the tracer head to the tracer arm; and a measuring element arranged on the tracer leg for detecting the deflections in the z direction;

wherein the tracer leg is connected to the tracer arm via an articulated shaft as a rocker; and wherein the optical deflection element is part of an optical arrangement, the optical arrangement including a light source mounted on the tracer arm for emitting a light beam to the optical deflection element, a waveguide device, and a position-sensitive optical receiver for detecting a beam reflected by the optical deflection element.

11. The tracer device of claim 10, further comprising:

an optical receiver; and an optical unit connected upstream from the optical receiver;

wherein the light source, the optical receiver, and optical unit are arranged on a section of the tracer arm facing the axial guide.

12. The tracer device of claim 11, wherein the axial guide is attachable to a part to be traced using an adapter that is adapted to an insertion opening of the part to be traced.

13. The tracer device of claim 11, wherein the axial device is associated with a control device, and the tracer arm is rotatable about its axis automatically and reproducibly by the control device.

14. The tracer device of claim 10, wherein the axial guide is attachable to a part to be traced using an adapter that is adapted to an insertion opening of the part to be traced.

15. The tracer device of claim 10, wherein the axial device is associated with a control device, and the tracer arm is rotatable about its axis automatically and reproducibly by the control device.

* * * * *